US012518569B2

(12) United States Patent
Bonyan Khamseh et al.

(10) Patent No.: US 12,518,569 B2
(45) Date of Patent: Jan. 6, 2026

(54) ELECTRIC VEHICLE RANGE MANAGEMENT

(71) Applicant: GM GLOBAL TECHNOLOGY OPERATIONS LLC, Detroit, MI (US)

(72) Inventors: Hossein Bonyan Khamseh, Markham (CA); Gaurav Talwar, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 18/353,466

(22) Filed: Jul. 17, 2023

(65) Prior Publication Data

US 2025/0029428 A1    Jan. 23, 2025

(51) Int. Cl.
*G07C 5/00* (2006.01)
(52) U.S. Cl.
CPC .................................... *G07C 5/004* (2013.01)
(58) Field of Classification Search
CPC ...................................................... G07C 5/004
See application file for complete search history.

(56) References Cited

U.S. PATENT DOCUMENTS

| 11,214,161 | B2* | 1/2022 | Miller | G06Q 10/04 |
| 11,567,503 | B1 | 1/2023 | Roy | |
| 2024/0312260 | A1* | 9/2024 | Ha | G07C 5/10 |
| 2024/0416794 | A1* | 12/2024 | Tseng | B60L 58/12 |

* cited by examiner

*Primary Examiner* — Kyle J Kingsland
(74) *Attorney, Agent, or Firm* — Quinn IP Law

(57) ABSTRACT

A method for managing range of an electric vehicle includes acquiring temperature forecast data for an upcoming time period and determining a range of the electric vehicle over the upcoming time period in view of the temperature forecast data. The method also includes determining a driving distance from the electric vehicle to a stationary electric vehicle charging station. Additionally, the method includes informing a user of the electric vehicle if, at one or more times during the upcoming time period, the range of the electric vehicle will be less than a threshold relative to the driving distance from the electric vehicle to the stationary electric vehicle charging station. Further, another method for managing range of an electric vehicle may take into account distance to one or more intended destinations.

20 Claims, 5 Drawing Sheets

ELECTRIC VEHICLE RANGE MANAGEMENT

INTRODUCTION

The present disclosure is in the field of range management for electric vehicles.

The driving range available to the driver of an electric vehicle may be a function of ambient temperature. Because "range anxiety," that is, uncertainty about the range available to the driver of an electric vehicle, is acknowledged to be an inhibitor to widespread adoption of electric vehicles, effectively managing electric vehicle driving range despite fluctuations in ambient temperature may be advantageous.

SUMMARY

A method for managing range of an electric vehicle includes acquiring temperature forecast data for an upcoming time period and determining a range of the electric vehicle over the upcoming time period in view of the temperature forecast data. The method further includes determining a driving distance from the electric vehicle to a stationary electric vehicle charging station. Additionally, the method includes informing a user of the electric vehicle if, at one or more times during the upcoming time period, the range of the electric vehicle will be less than a threshold relative to the driving distance from the electric vehicle to the stationary electric vehicle charging station. The stationary electric vehicle charging station may be the closest stationary electrical vehicle charging station by driving distance to the electric vehicle. The threshold may be 100% of the driving distance from the electric vehicle to the stationary electric vehicle charging station.

Acquiring temperature forecast data for an upcoming time period may further include acquiring temperature forecast data for the upcoming time period at a current location of the electric vehicle and acquiring temperature forecast data for the upcoming time period at a second location.

The method for managing range of an electric vehicle may additionally include identifying to the user one or more mobile charging services if the range of the electric vehicle will be less than the threshold.

An alternative method for managing range of an electric vehicle includes acquiring temperature forecast data for an upcoming time period and determining a range of the electric vehicle in view of the temperature forecast data. The method also includes determining a driving distance from the electric vehicle to a destination. Further, the method includes informing a user of the electric vehicle if, at one or more times during the upcoming time period, the range of the electric vehicle will be less than a threshold relative to the driving distance from the electric vehicle to the destination.

The threshold may be 100% of the driving distance from the electric vehicle to the destination. Further, the destination may be provided by the user or may be inferred from past trips driven by the user.

Additionally, as enhancements, wherein the destination may be a workplace of the user or may be a home of the user.

The method may additionally include identifying to the user of the electric vehicle locations of one or more stationary electric vehicle charging stations if the range of the electric vehicle will be less than the threshold. Further, the method may include identifying to the user one or more mobile electric vehicle charging services if the range of the electric vehicle will be less than the threshold.

Acquiring temperature forecast data for an upcoming time period may include acquiring temperature forecast data for the upcoming time period at a current location of the electric vehicle and acquiring temperature forecast data for the upcoming time period at a second location.

A range management system for an electric vehicle includes one or more controllers collectively programmed with the following instructions: acquire temperature forecast data for an upcoming time period; determine a range of the electric vehicle in view of the temperature forecast data; determine a driving distance from the electric vehicle to a destination; and inform a user of the electric vehicle if, at one or more times during the upcoming time period, the range of the electric vehicle will be less than a threshold relative to the driving distance from the electric vehicle to the destination. The threshold may be 100% of the driving distance from the electric vehicle to the destination.

As an enhancement to the system, the destination may inferred from past trips driven by the user.

As further enhancement, the one or more controllers may be further collectively programmed to identify to the user of the electric vehicle locations of one or more stationary electric vehicle charging stations if the range of the electric vehicle will be less than the threshold. As a still further enhancement, the one or more controllers may be collectively programmed to identify to the user one or more mobile electric vehicle charging services if the range of the electric vehicle will be less than the threshold.

The one or more controllers may be further collectively programmed to acquire temperature forecast data for the upcoming time period at a current location of the electric vehicle and to acquire temperature forecast data for the upcoming time period at a second location.

The above summary does not represent every embodiment or every aspect of this disclosure. Other possible features and advantages will be readily apparent from the following detailed description of the embodiments for carrying out the disclosure when taken in connection with the accompanying drawings and appended claims. Further, combinations and subcombinations of elements described in this disclosure are expressly included in this disclosure.

DETAILED DESCRIPTION

Figure 1:
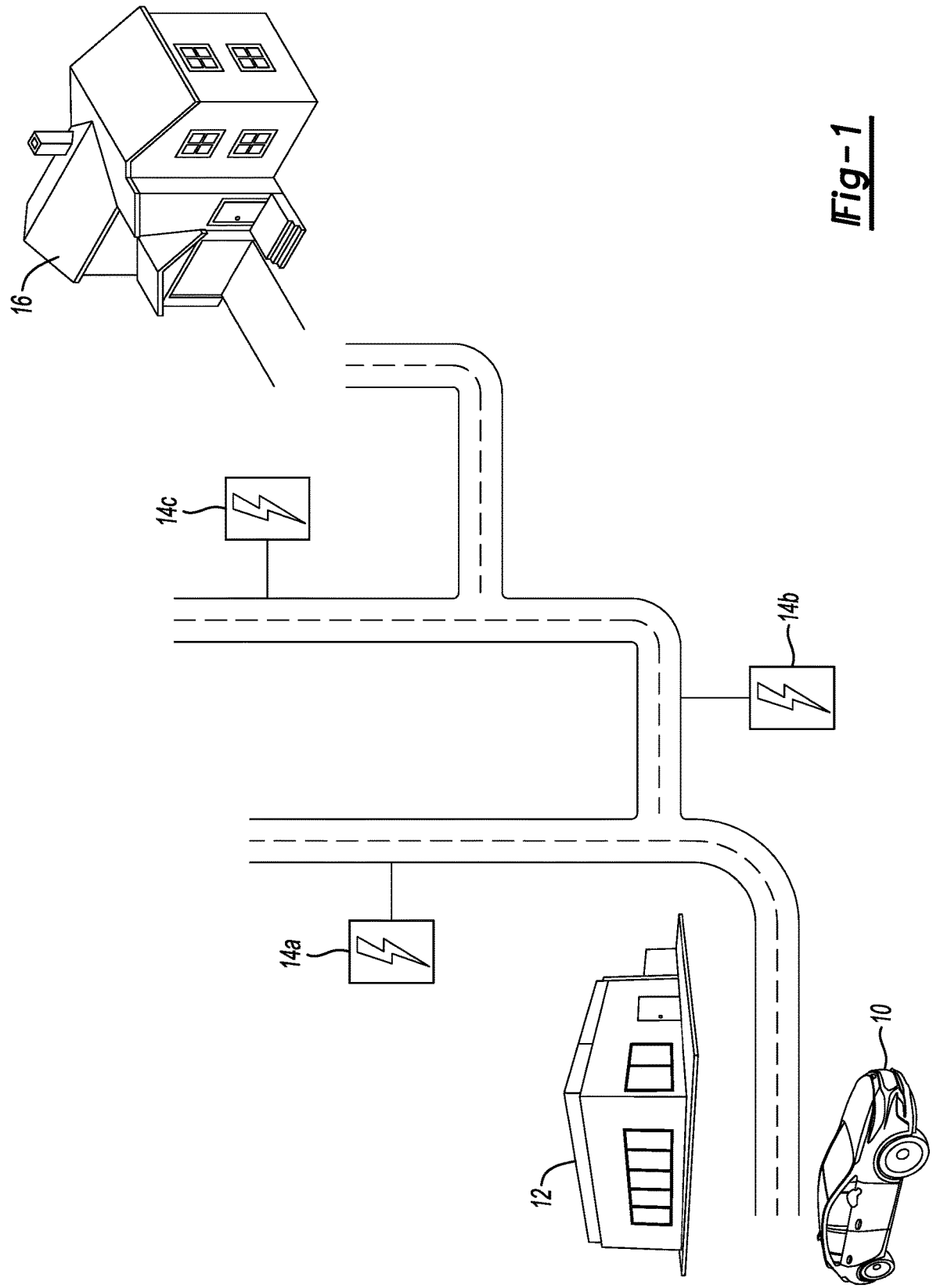
FIG. 1 is a map showing a present location and an intended destination of an electric vehicle, as well as the locations of several stationary electric vehicle charging stations.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

Referring first to FIG. 1, an electric vehicle 10 is parked at parking location 12. Parking location 12 may be a building that may be a commercial building, such as a workplace. Parking location 12 may also be a home or another building where electric vehicle 10 may be parked. Also schematically illustrated in FIG. 1 are three electric vehicle charging stations 14a, 14b, and 14c. Charging stations 14a-14c may be Level 2 chargers.

The user of electric vehicle 10, such as the driver thereof, may have a destination 16 to which the driver plans to drive when the driver next drives electric vehicle 10. Destination 16 may be, for instance, the driver's home or, if electric vehicle 10 has been parked at home, the driver's workplace. The driver of electric vehicle 10 may want to know whether electric vehicle 10 has enough range to reach destination 16. Additionally, the driver of electric vehicle 10 may want to know whether electric vehicle 10 has at least enough range to reach one or more charging stations 14a-14c, so that electric vehicle 10 will not be stranded due to its traction batteries being depleted.

Figure 2:
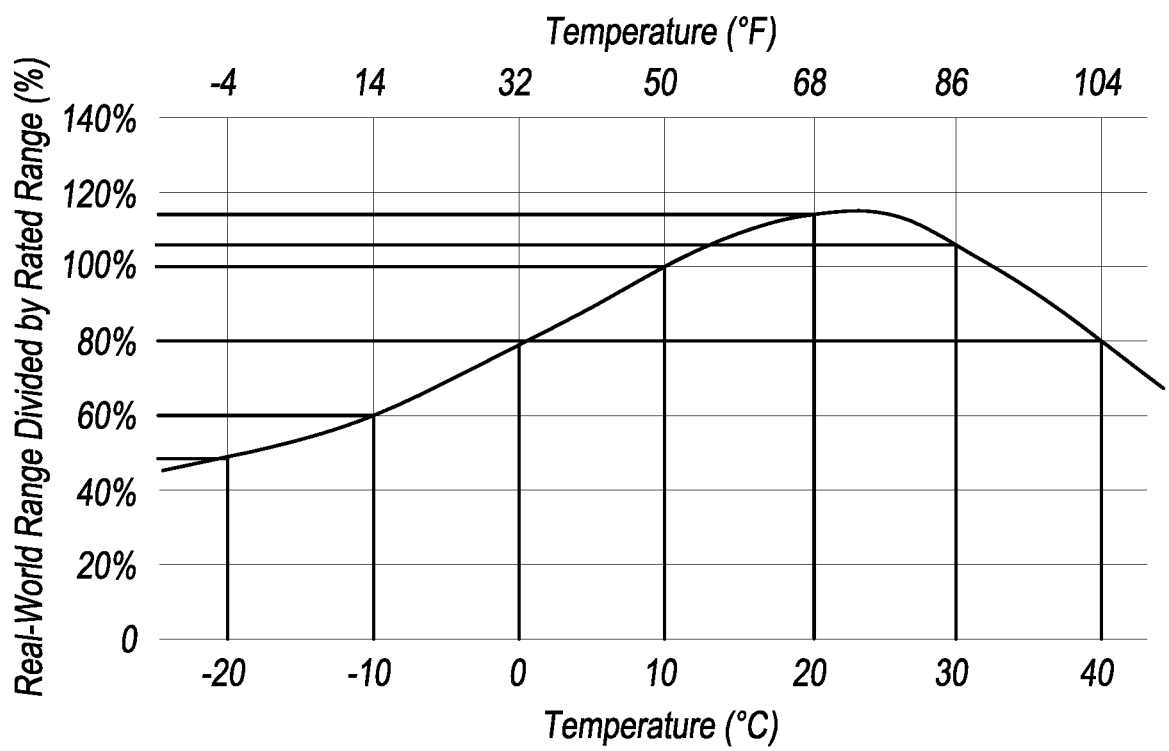
FIG. 2 is a graph showing a representative relationship between electric vehicle range and ambient temperature.

The driving range available to electric vehicle 10 may be a function of ambient temperature at the location of electric vehicle 10. FIG. 2 illustrates one representative relationship of vehicle range versus ambient temperature for an electric vehicle. The x-axis represents ambient temperature, and the y-axis represents the ratio of actual (or "real-world") range to theoretical (or "rated") range of electric vehicle 10. For a given state of charge of the vehicle's battery, range may be highest at or around room temperature (say, approximately 20° C. or 68° F.) and drop off above and below that temperature, sometimes in a substantial manner. Range may be a function of ambient temperature for a number of reasons. Battery chemistry is one, and friction in the mechanical components of electric vehicle 10 is another.

The driver of electric vehicle 10 that is parked may intend to travel in electric vehicle 10 at a time in the future, say, for instance, at the end of a workday after having parked electric vehicle 10 at the driver's workplace at the beginning of the day. Thus, the ambient temperature at such a time in the future, which may be several hours from the present time, may bear on the range available to electric vehicle 10 at the intended travelling time.

Figure 3:
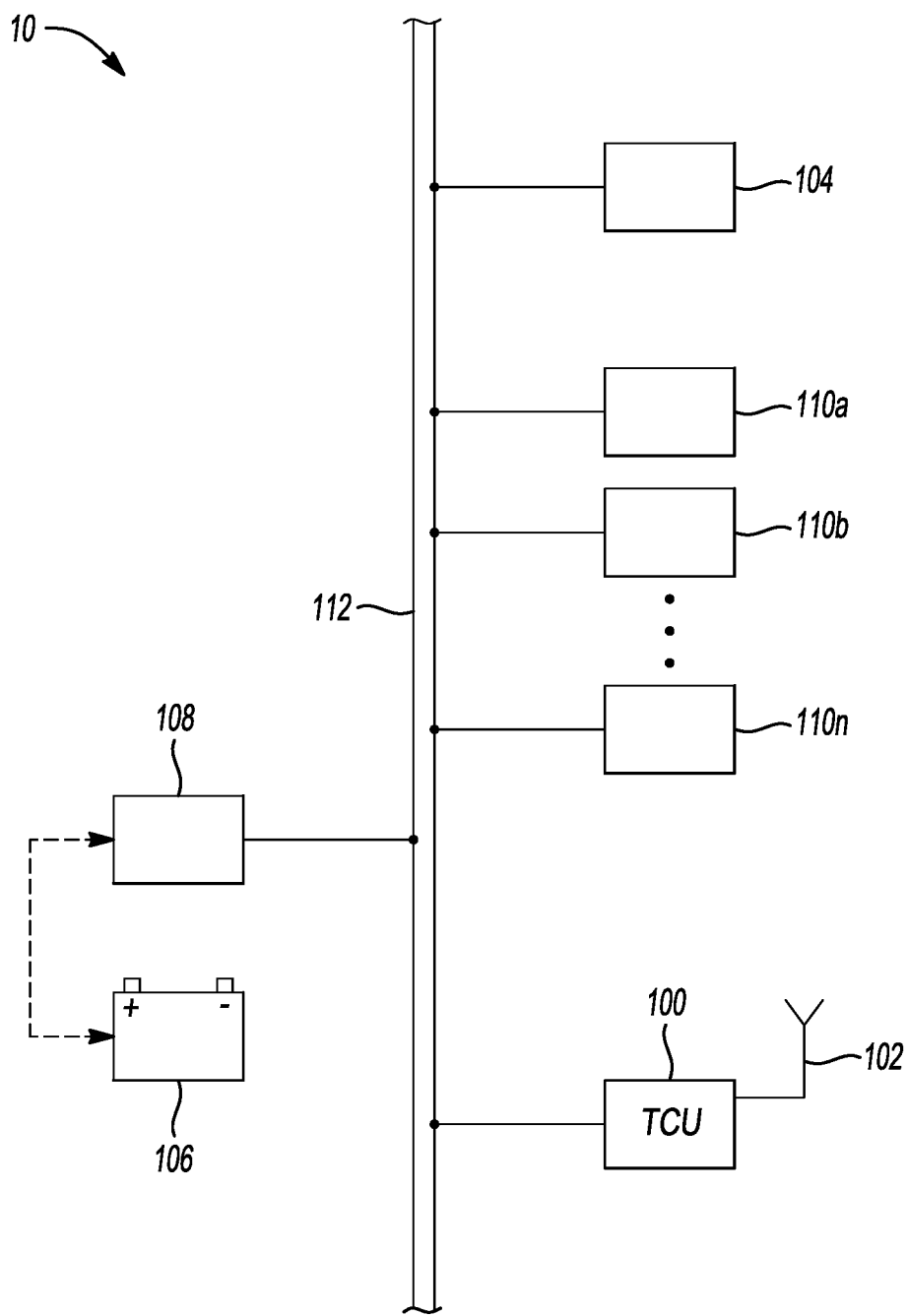
FIG. 3 illustrates a portion of the electrical system of the vehicle.

Referring now to FIG. 3, electric vehicle 10 may contain several controllers in its electrical system. For instance, electric vehicle 10 may contain a cellular telecommunications unit ("TCU") 100 that allows electric vehicle 10 to engage in cellular telecommunications. Such telecommunications may include telecommunications with a "back office" operated by the manufacturer of electric vehicle 10. (OnStar®, operated by General Motors, is an example of one such back office.) TCU 100 may have an antenna 102 that facilitates such communication. Electric vehicle 10 may also have a drivetrain controller 104 that controls the motors that drive electric vehicle 10 using energy stored in one or more traction batteries 106. Electric vehicle 10 may also have a battery controller 108 that controls the charging of traction batteries 106 and monitors their state of charge. Certainly, electric vehicle 10 may have numerous other controllers 110a-110n to control other functions of electric vehicle 10, such as braking, infotainment, steering, lighting, and the like. The various controllers on electric vehicle 10 may be networked together by one or more data buses 112 or by individual electrical circuits, and the controllers may therefore share data in performing their various functions. Further, the electrical system of electric vehicle 10 may be partitioned differently than as shown in FIG. 3, with the functions performed by different or other controllers.

The various calculations and comparisons to be hereinafter described in this disclosure may be performed by one controller or collectively by the several controllers that may be networked together in the electrical system of electric vehicle 10. Each of those controllers may, individually or collectively, have sufficient electronic resources (microprocessor, memory, inputs, outputs, software, cellular network access device ("NAD"), global positioning sensor ("GPS") position sensing)) to perform the functions described in this disclosure. Likewise, some of the calculations and comparisons may be performed by the mobile phone of the driver of electric vehicle 10, which mobile phone itself may have sufficient electronic resources to perform some or all of the functions described herein.

Figure 4:
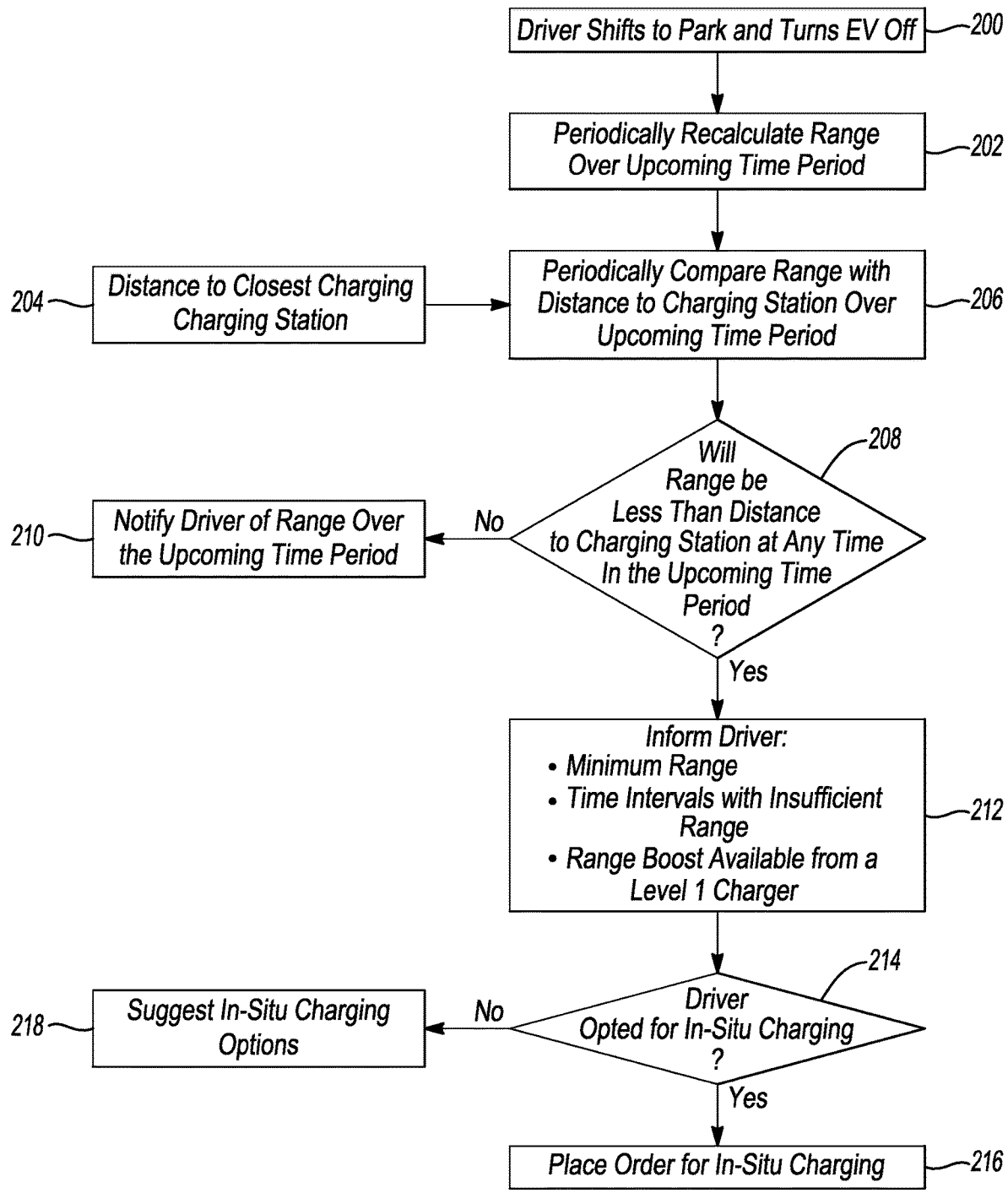
FIG. 4 is a flowchart illustrating one method of managing range of the electric vehicle.

FIG. 4 illustrates a method to manage the driving range of electric vehicle 10. At block 200, the driver of electric vehicle 10 shifts the electric vehicle (EV) to Park and turns the vehicle off. At block 202, the remaining range of electric vehicle 10 is periodically recalculated for an upcoming time period. The upcoming time period may be input by the driver into an app (such as an app provided by some motor vehicle manufacturers) or input into a user interface (such as a touch screen) in electric vehicle 10. To recalculate the remaining range of electric vehicle 10, the last range calculation before the vehicle was turned off may be corrected by the expected ambient temperature at the location of electric vehicle 10 over the upcoming time period using, for instance, the range-temperature relationship illustrated in FIG. 2. The expected ambient temperature used may alternatively be the expected ambient temperature at the closest place to parking location 12 for which forecast temperature data is available.

The worst-case ambient temperature over the upcoming time period may be used at block 202, in order to arrive at the worst-case available driving range. (Expected or forecasted ambient temperature is available through one or more weather forecasting resources and would thus be available to one or more controllers on electric vehicle 10 and/or to the app on the driver's mobile phone, due to the cellular telecommunications capability of these devices.) At block 206, the corrected range of electric vehicle 10 may be compared to the distance from electric vehicle 10 to the closest charging station 14a-14c. The charging station may be a Level 2 charging station. The distance to the closest charging station is input from block 204 into the comparison performed at block 206. The existence of and distance to charging stations 14a-14c may be available either in memory in a controller in electric vehicle 10, via an app on the driver's mobile phone, via the "back office" associated with the manufacturer of electric vehicle 10, or via the Internet.

The "closest" charging station 14a-14c may be based on a number of criteria. It may be the closest driving distance along any driving path. It may be the closest along a driving path that meets predetermined criteria, such as driving paths only having improved (that is, paved) roads. The "closest" charging station may also be the closest that is on a driving path that leads in the general direction of destination 16. The criteria may be preprogrammed, or they may be selectable by the driver.

At block 208, it is determined whether at any time during the upcoming time period the estimated range of electric vehicle 10 will be less than the distance to the closest charging station 14a-14c. If NO, the driver may be notified at block 210 of the minimum range that will be available for electric vehicle 10, taking into account the worst-case forecasted ambient temperature over the upcoming time period. Available ranges at various times during the upcoming time period, not just time at which range will be at its minimum, may also be provided.

If, on the other hand, the comparison at block 208 concludes that the expected range of electric vehicle 10 over the upcoming time period will be less than the distance to the closest charging station 14a-14c, the method moves to block 212. There, the driver may be notified about the minimum range that will be available over the upcoming time period, as well as the time intervals over that upcoming time period when the estimated range of electric vehicle 10 will be less than the distance to the closest charging station 14a-14c. Those time intervals are time intervals when the driver of electric vehicle 10 risks being stranded due to insufficient charge in the traction batteries 106 of electric vehicle 10. The driver may also be informed of the potential range boost that may be available from Level 1 charging over the upcoming time period in order to help offset range that may have been lost due to the effect of temperature on the range of electric vehicle 10 (for instance, as illustrated in FIG. 2). (The nominal power available from a Level 1 charger is known and therefore the added range that may be provided by a Level 1 charger over a given time period can be estimated.) At block 214, it is determined whether the driver of electric vehicle 10 has opted for a subscription to an in-situ charging option, i.e., a service where a mobile charger (such as a Level 2 charger) may be brought to electric vehicle 10 in order to provide charging to overcome the projected deficiency in range. If the driver does have a subscription to mobile charging, an order may be placed at block 216 for a charging session, perhaps subject to the driver confirming the order. If the driver does not have a subscription to mobile charging, mobile charging services in proximity to electric vehicle 10 may be suggested to the driver at block 218.

As an enhancement at block 212, the system may place a mobile charging order for electric vehicle 10 if the driver ignores one or more notices given at block 212 about insufficient range. Such automatic mobile charging ordering capability may be a feature that the driver may turn "on" or "off" at the driver's discretion. The number of ignored notices that may trigger an automatic mobile charging order may also be configured at the driver's discretion.

When mobile charging, the driver may elect to fully charge electric vehicle 10 or only partially charge electric vehicle 10. Given that mobile charging may be more expensive than charging at a stationary electric vehicle charging station, the driver may elect to only partially charge electric vehicle 10 using mobile charging and then subsequently more fully charge electric vehicle 10 at a stationary electric vehicle charging station.

As an enhancement, the expected range calculation at block 202 may be based on the temperature forecast at some or all locations between parking location 12 and the closest charging station 14a-14c over the upcoming time period, not solely the temperature forecast at parking location 12, and the expected range calculated on the worst-case ambient temperature anywhere between electric vehicle 10 and the closest charging station 14a-14c.

As another variation, the comparison at block 208 may be between the range of electric vehicle 10 and a threshold relative to the distance from the electric vehicle to the respective charging station. As described above, that threshold may be the distance from the electric vehicle to the charging station, that is, 100% of that distance. However, a safety factor may be built in; the threshold may be more than 100%, say 120%. The threshold may also be a specific number of miles more than the distance to the charging station, say, 25 miles. The threshold may also be selected by the user of electric vehicle 10.

As further enhancements, the charging station 14a-14c whose distance from electric vehicle 10 is acquired at block 204 may be one specifically selected by the user of electric vehicle 10 (through the app or through the user interface of electric vehicle 10, for instance), rather than necessarily the closest charging station 14a-14c. Further, the charging station 14a-14c whose distance is from electric vehicle 10 is acquired at block 204 may be one from a network of charging stations to which the user of electric vehicle 10 has a subscription or another existing business relationship. Further yet, the charging station 14a-14c whose distance from electric vehicle 10 is acquired at block 204 may be the closest charging station that is known to be compatible for charging electric vehicle 10; various charging and interface technologies exist, and not all electric vehicles are compatible with and may be charged by all electric vehicle chargers. Driving distances to the closest several charging stations 14a-14c, or the closest several compatible charging stations 14a-14c, may be used. "Several" may be, for instance, three.

Figure 5:
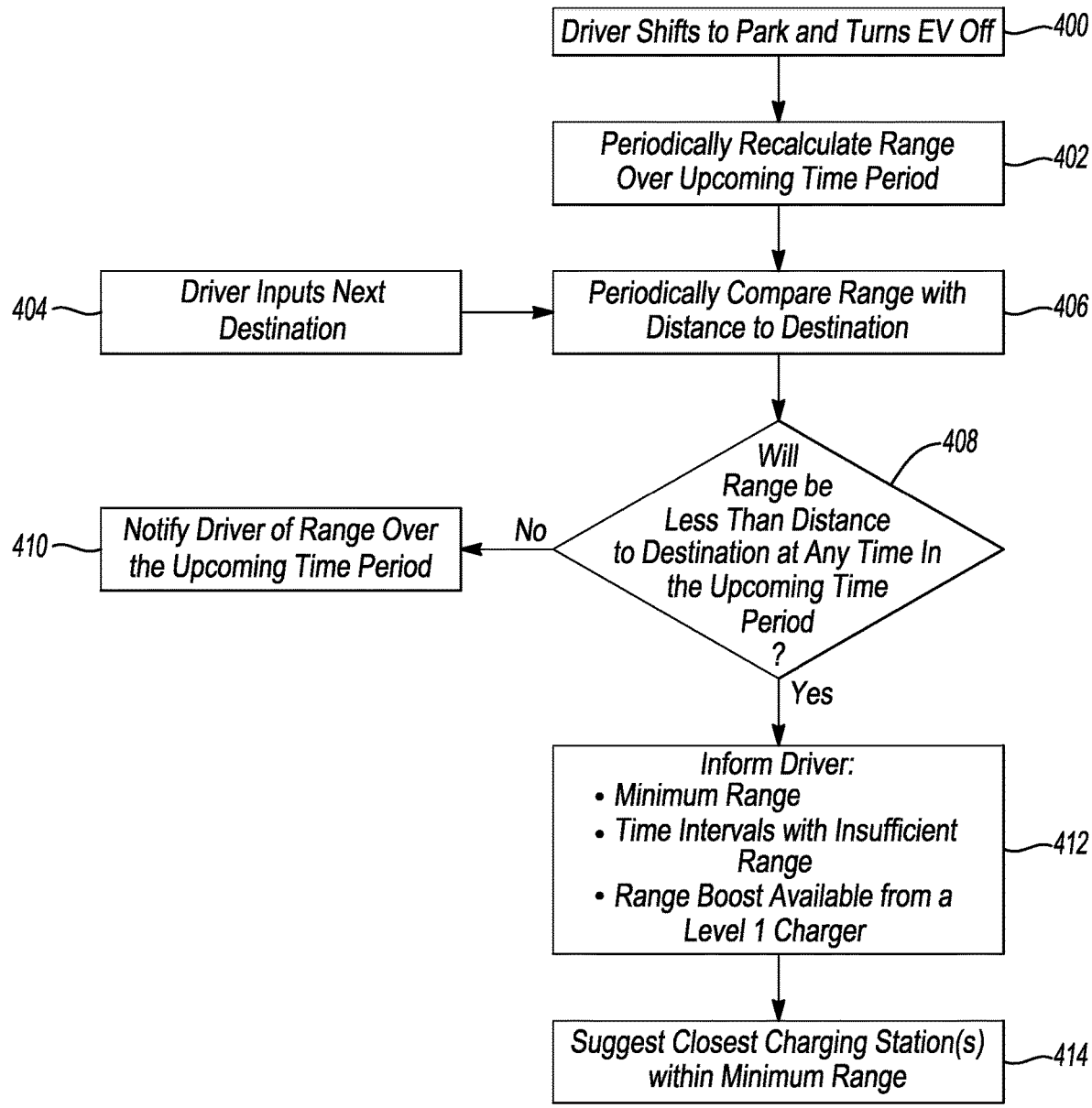
FIG. 5 is a flowchart illustrating a second method of managing range of the electric vehicle.

An alternative method for range management of electric vehicle 10 is illustrated with additional reference to FIG. 5. At block 400, the driver of electric vehicle 10 parks the electric vehicle 10 by shifting to Park and turning electric vehicle 10 off. At block 402, the remaining range of electric vehicle 10 is periodically recalculated for an upcoming time period. The upcoming time period may be input by the driver into a mobile phone app or input into a user interface in electric vehicle 10, such as a touch screen. To recalculate the remaining range of electric vehicle 10, the last range calculation before the vehicle was turned off may be corrected by the forecasted ambient temperature over that upcoming time period, using, for instance, the range-temperature relationship illustrated in FIG. 2. At block 404, the driver inputs (or had input, say at the time of parking electric vehicle 10) the next destination 16 to which the driver plans to travel in electric vehicle 10.

At block 406, the minimum range estimated to be available over the upcoming time period is compared with the distance for electric vehicle 10 to travel to destination 16. (The distance may be via a route selected by the driver or by route planning software that may be carried in an app in the driver's mobile phone or available via a "back office" associated with electric vehicle 10.) The minimum available range may be the worst-case range at the minimum temperature forecast over the upcoming time period. At block 408, it is determined whether the minimum range available over the upcoming time period will be less than the distance to travel to destination 16. If NO, that is, if there is projected to be sufficient range to reach destination 16, the driver may be notified at block 410 of the minimum range available over the upcoming time period. Available ranges based on several possible ambient temperatures during the upcoming time period, not just the worst case, may also be provided.

The distance for electric vehicle 10 to travel to destination 16 may be based on a number of criteria. It may be the shortest distance along any driving path. It may also be the shortest distance along a driving path that meets predetermined criteria, such as driving paths only having improved (that is, paved) roads. The criteria may be preprogrammed, or they may be selectable by the driver.

If, however, the comparison at block 408 concludes that the minimum range of electric vehicle 10 is insufficient to travel to destination 16, the routine may proceed to block 412. There, the driver is notified of the minimum range available over the upcoming time period, as well as the time intervals over that upcoming time period when the estimated range of electric vehicle 10 will be less than the distance to destination 16. Those time intervals are time intervals when the driver of electric vehicle 10 risks failing to reach destination 16 due to insufficient charge in traction batteries 106 of electric vehicle 10. The driver may also be informed of the potential range boost that may be available from Level 1 charging over the upcoming time period in order to help offset range that may have been lost due to the effect of temperature on the range of electric vehicle 10 (for instance, as illustrated in FIG. 2). Further, at block 414, the driver may be informed of the closest Level 2 charging station or stations to electric vehicle 10, given that electric vehicle 10 is projected to have insufficient range to travel to destination 16.

As an enhancement, the expected range calculation at block 402 may be based on the temperature forecast at some or all locations between parking location 12 and destination 16 over the upcoming time period, not solely the temperature forecast at parking location 12, and the expected range calculated on the worst-case ambient temperature anywhere between parking location 12 and destination 16.

As another variation, the comparison at block 408 may be between the range of electric vehicle 10 and a threshold relative to the driving distance from electric vehicle 10 to destination 16. That threshold may be the driving distance from electric vehicle 10 to destination 16, that is, 100% of that distance. However, a safety factor may be built in; the threshold may be more than 100%, say 120%. The threshold may also be a specific number of miles more than the distance to destination 16, say, 25 miles. The threshold may also be selected by the user of electric vehicle 10.

Instead of or in addition to the driver of electric vehicle 10 inputting destination 16, destination 16 may be inferred, say, based on daily travel patterns of the driver of electric vehicle 10. The driver may, for example, travel to a workplace regularly in the morning and back home regularly in the afternoon or evening. Those destinations may be inferred by the system disclosed herein and suggested to the driver, and the driver may then confirm which, if any, is indeed intended destination 16.

As an enhancement to the range management method described above with reference to FIG. 5, the driver of electric vehicle 10 may input multiple destinations 16. The comparison at block 408 may then be whether electric vehicle 10 has enough range to reach all of destinations 16.

Interface with the driver of electric vehicle 10 for the functions described in this disclosure may be via a mobile "app" (or application) installed on the driver's mobile phone. The app may be provided by the manufacturer of electric vehicle 10. The app may communicate via cellular communication with a telecommunications service "back office" operated by the manufacturer of the motor vehicle, such as ONSTAR®, operated by General Motors. Further, then, relevant data about the state of electric vehicle 10 may also be available to the back office by virtue of electric vehicle 10 having cellular data communications capability such as through TCU 100 installed in electric vehicle 10. TCU 100 may then itself be interconnected within the electrical system of electric vehicle 10 and may have access to various relevant vehicle data, such as for instance the state of the transmission of electric vehicle 10 (that is, whether electric vehicle 10 is in Park or in a different gear than Park), the ON/OFF state of electric vehicle 10, the state of charge and projected range of traction batteries 106, and the location of electric vehicle 10.

As described herein, a "Level 1" charger may be a charger intended to operate at typical residential or consumer voltage (say, 110/120V) and adapted to plug into a standard residential 110/120V outlet. A "Level 2" charger may be a charger intended to operate at higher voltage (say, 208/240V), providing higher charging power and faster charging than available through a Level 1 charger. Certainly, the teachings of this disclosure are not limited to present designations of chargers as "Level 1" or "Level 2" or the specific voltage levels discussed herein.

The locations of compatible Level 2 charging stations may be available in memory in a controller in electric vehicle 10, in the mobile phone app described herein, via the "back office" associated with electric vehicle 10, or via the Internet.

As an enhancement whenever a charging option (either Level 1 or mobile charging, which can be Level 1 or Level 2) is presented or suggested to the driver, the driver may also be given estimates of the time and cost of either partially or fully charging electric vehicle 10 using the presented or suggested charging options.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for managing range of an electric vehicle, the method comprising:
   parking the electric vehicle;
   while the vehicle is parked, acquiring temperature forecast data for an upcoming time period, the upcoming time period longer than one instantaneous time;
   determining a worst-case range of the electric vehicle over the upcoming time period in view of the temperature forecast data;
   determining a driving distance from the electric vehicle to a stationary electric vehicle charging station; and
   informing a user of the electric vehicle in the event that, at any time during the upcoming time period, the worst-case range of the electric vehicle will be less than a threshold relative to the driving distance from the electric vehicle to the stationary electric vehicle charging station.

2. The method of claim 1, wherein the threshold is more than the driving distance from the electric vehicle to the stationary electric vehicle charging station.

3. The method of claim 1, wherein acquiring temperature forecast data for an upcoming time period comprises:
   acquiring temperature forecast data for the upcoming time period at a current location of the electric vehicle; and
   acquiring temperature forecast data for the upcoming time period at a second location.

4. The method of claim 1, wherein the stationary electric vehicle charging station is the closest stationary electrical vehicle charging station by driving distance to the electric vehicle.

5. The method of claim 1, further comprising identifying to the user one or more mobile charging services in the event that the range of the electric vehicle will be less than the threshold.

6. The method of claim 1, wherein the worst-case range includes a range reduction due to rising temperature.

7. The method of claim 1, further comprising informing the user of a range boost that would be available through use of a Level 1 battery charger.

8. The method of claim 1, wherein:
informing the driver comprises giving the driver a notice about insufficient range; and
the method further comprises placing a mobile charging order for the electric vehicle in the event that the driver ignores the notice.

9. A method for managing range of an electric vehicle, the method comprising:
while the electric vehicle is parked, acquiring temperature forecast data for an upcoming time period, the upcoming time period longer than one instantaneous time;
determining a worst-case range of the electric vehicle over the upcoming time period in view of the temperature forecast data;
determining a driving distance from the electric vehicle to a destination; and
informing a user of the electric vehicle in the event that, at one or more times during the upcoming time period, the worst-case range of the electric vehicle will be less than a threshold relative to the driving distance from the electric vehicle to the destination.

10. The method of claim 9, wherein the threshold is more than the driving distance from the electric vehicle to the destination.

11. The method of claim 9, wherein the destination is inferred from past trips driven by the user.

12. The method of claim 9, further comprising identifying to the user of the electric vehicle locations of one or more stationary electric vehicle charging stations in the event that the range of the electric vehicle will be less than the threshold.

13. The method of claim 9, further comprising identifying to the user one or more mobile electric vehicle charging services in the event that the range of the electric vehicle will be less than the threshold.

14. The method of claim 9, wherein acquiring temperature forecast data for an upcoming time period comprises:
acquiring temperature forecast data for the upcoming time period at a current location of the electric vehicle; and
acquiring temperature forecast data for the upcoming time period at a second location.

15. A range management system for an electric vehicle, the system comprising one or more controllers collectively programmed with the following instructions:
while the electric vehicle is parked, acquire temperature forecast data for an upcoming time period, the upcoming time period longer than one instantaneous time;
determine a worst-case range of the electric vehicle over the upcoming time period in view of the temperature forecast data;
determine a driving distance from the electric vehicle to a destination; and
inform a user of the electric vehicle in the event that, at any time during the upcoming time period, the worst-case range of the electric vehicle will be less than a threshold relative to the driving distance from the electric vehicle to the destination.

16. The system of claim 15, wherein the threshold is more than the driving distance from the electric vehicle to the destination.

17. The system of claim 15, wherein the destination is inferred from past trips driven by the user.

18. The system of claim 15, wherein the one or more controllers are further collectively programmed with the following instruction:
identify to the user of the electric vehicle locations of one or more stationary electric vehicle charging stations in the event that the range of the electric vehicle will be less than the threshold.

19. The system of claim 15, wherein the one or more controllers are further collectively programmed with the following instruction:
identify to the user one or more mobile electric vehicle charging services in the event that the range of the electric vehicle will be less than the threshold.

20. The system of claim 15, wherein the one or more controllers are further collectively programmed with the following instruction:
acquire temperature forecast data for the upcoming time period at a current location of the electric vehicle; and
acquire temperature forecast data for the upcoming time period at a second location.

* * * * *